W. I. TWOMBLY.
VARIABLE SPEED POWER TRANSMISSION MECHANISM.
APPLICATION FILED APR. 12, 1910.
1,038,689.
Patented Sept. 17, 1912.
3 SHEETS—SHEET 1.
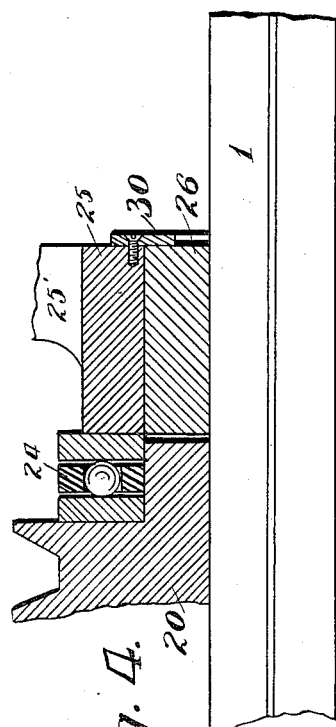
Fig. 4.
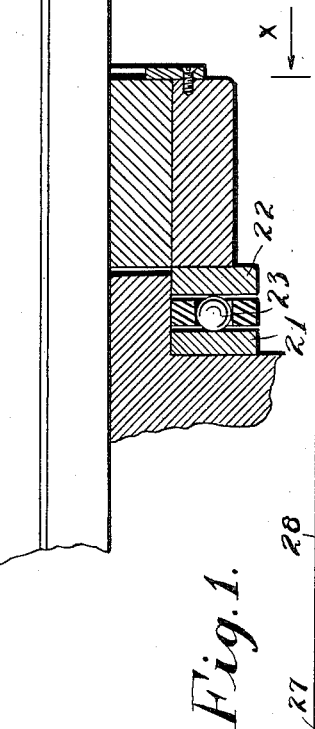
Fig. 1.
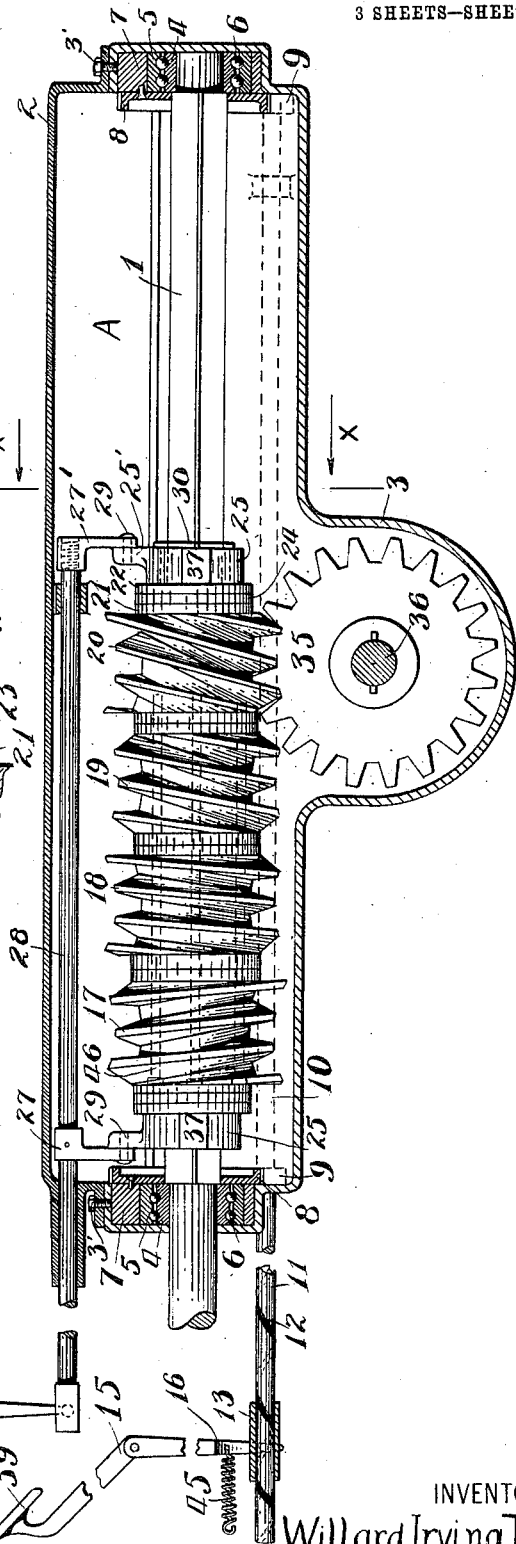
WITNESSES:
Percy A. Smith
Howard C. Thompson
INVENTOR:
Willard Irving Twombly
BY
John C. Seifert
ATTORNEY

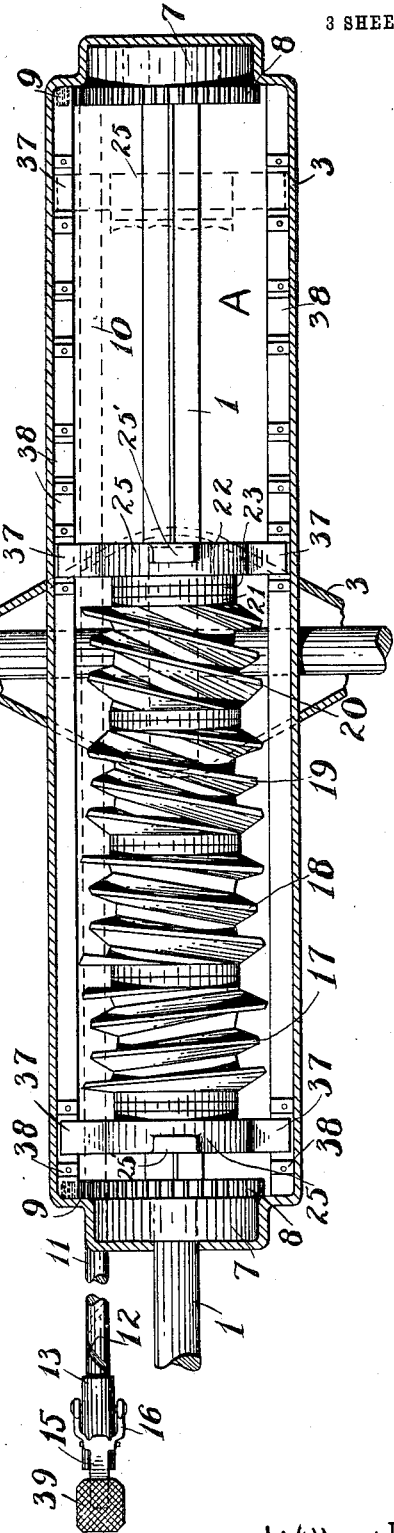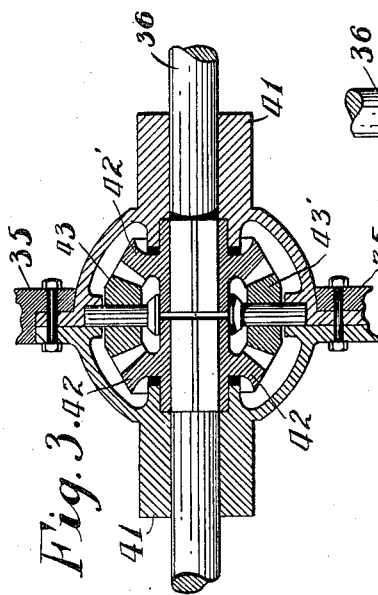

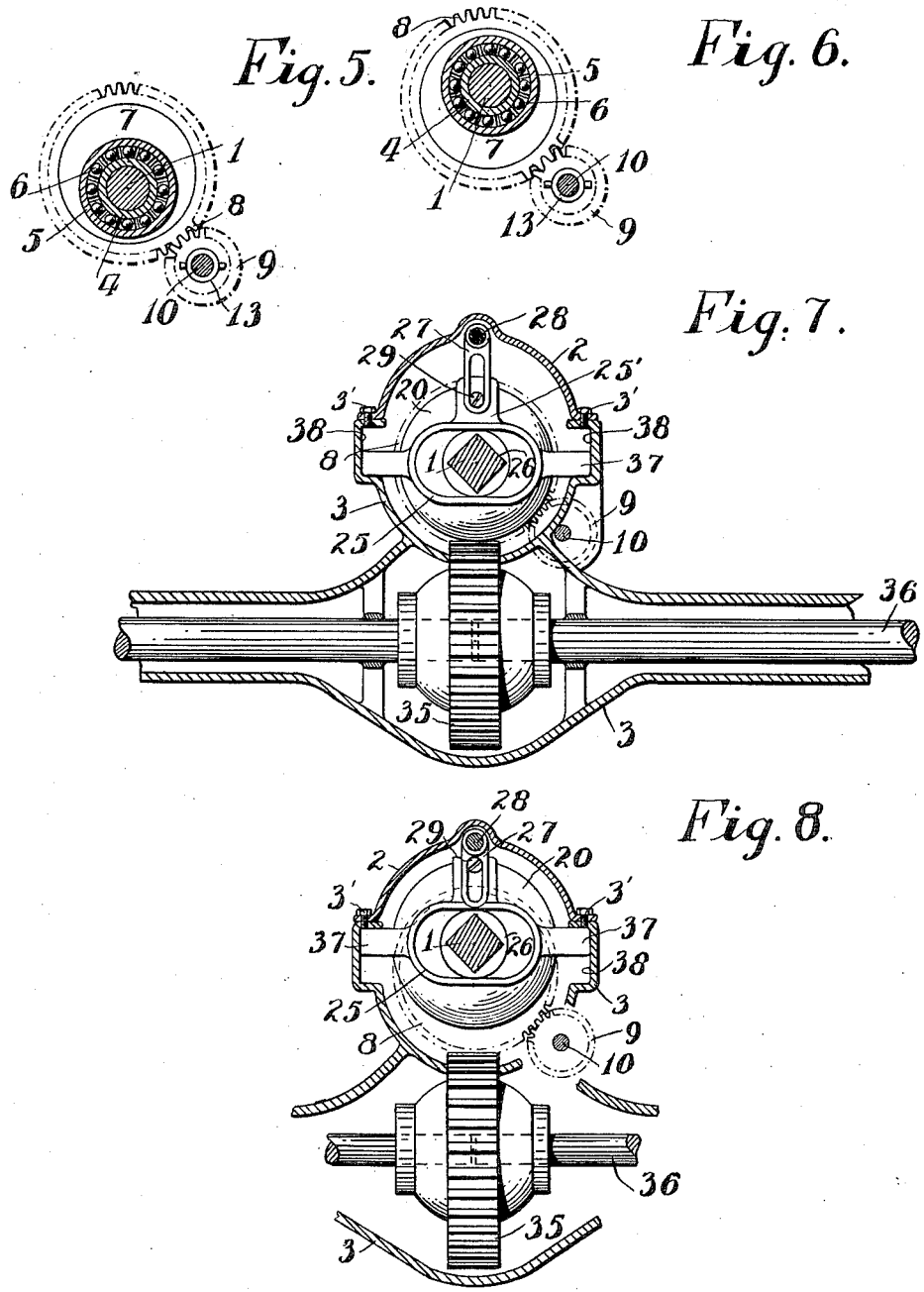

UNITED STATES PATENT OFFICE.

WILLARD IRVING TWOMBLY, OF NEW YORK, N. Y., ASSIGNOR, BY MESNE ASSIGNMENTS, TO TWOMBLY MOTORS COMPANY, OF NEW YORK, N. Y., A CORPORATION OF NEW YORK.

VARIABLE-SPEED POWER-TRANSMISSION MECHANISM.

1,038,689.  Specification of Letters Patent.  Patented Sept. 17, 1912.

Application filed April 12, 1910. Serial No. 554,977.

*To all whom it may concern:*

Be it known that I, WILLARD I. TWOMBLY, a citizen of the United States, residing in the borough of Manhattan, in the city, county, and State of New York, have invented a new and useful Improvement in Variable-Speed Power-Transmission Mechanism, of which the following is a specification.

This invention relates to variable speed power transmission mechanism, and it is the object of the invention to provide a transmission mechanism of this character of the selective type, whereby variable forward and reverse speeds may be obtained.

It is a further object of the invention to provide a transmission mechanism that is simple, compact and cheap in construction, in which all of the parts are easily assembled, and will be efficient in operation.

In carrying out the invention I provide a driving element having a plurality of single and multiple threaded worms, the pitch of at least one of which worms is opposite to the pitch of the other worms, and a driven element having a worm wheel connected thereto with which either one of the worms may mesh, selective mechanism being provided to throw either one of said worms into mesh with the worm wheel to transmit variable forward and reverse speeds to the driven element; all of which mechanism is operatively mounted in a suitable casing.

In the drawings accompanying and forming a part of this specification, Figure 1 is a side elevation, partly in section, of my improved transmission mechanism. Fig. 2 is a plan view partly in section. Fig. 3 is a sectional view illustrating the worm wheel as mounted on an axle provided with differential gearing. Fig. 4 is a sectional view of the means to adjust the worms along the drive shaft. Fig. 5 is a sectional end view of the drive-shaft bearing, showing the positions of the parts when one of the worms is in mesh with the worm wheel. Fig. 6 is a view similar to Fig. 5, but illustrating the parts in the positions they assume when the worms are thrown out of mesh with the worm wheel. Fig. 7 is a sectional end elevation taken on the line X—X of Fig. 1 looking in the direction of the arrow, the parts being in operative position; and Fig. 8 is a similar view, but illustrates the worm in neutral position out of mesh with the worm wheel.

Similar characters of reference designate like parts throughout different views of the drawings.

In the present instance I have shown the transmission mechanism as applied to the axle of the driving wheels of a motor vehicle, such as an automobile, to form a part of the driving mechanism thereof, although it will be obvious that it is applicable to other purposes for which a variable speed power transmission mechanism is adapted.

A primary power or drive shaft 1, connected to any suitable source of power (not shown) is journaled in the ends of a casing (designated in a general way by A), comprising an upper section 2 and a lower section 3 releasably secured together in any suitable manner, as by screws 3', said lower section 3 not only serving as the bearing and housing for the driven shaft, but also in the present instance constitutes the wheel axle.

The bearings for the shaft 1 comprise ball bearings of ordinary construction each consisting of a collar 4 surrounding the shaft, and a ring 5 surrounding said collar, race-ways being formed in said collar and ring for balls 6. Each ball bearing is carried in an eccentric disk 7 rotatably mounted in the ends of the casing. Connected to said eccentric disks, or formed integral therewith, are gears 8 meshing with pinions 9 fixed to a shaft 10 journaled in the lower case section 3, and provided with a projecting portion 11 having a helical groove or thread 12. Mounted on said projecting shaft portion 11 is a sleeve 13 in the form of a nut having a thread corresponding to, and engaging with the thread 12 in the shaft portion 11. An operating lever or actuator 15 has a forked portion 16 to straddle the sleeve 13 and whereby the lever is connected to the sleeve, said lever operable to slide the sleeve along the shaft portion 11 to impart rotary motion to said shaft and pinions 9 and to the eccentric 7, the function of which will be hereinafter described.

That portion of shaft 1 within the casing is square in cross section, and I mount on said shaft to rotate therewith and have sliding movement thereon a series of single and multiple threaded worms 17, 18, 19 and 20, all of said worms being of the same diameter and pitch but of different angles, and the pitch of one of which worms, as 17 for instance, is opposite to the pitch of the other worms. Said worms are adapted to mesh with and drive a worm wheel or gear 35 fixed on a shaft 36. For illustration I have shown in the drawings the drive shaft as provided with four worms to transmit three different forward speeds and one reverse speed to the driven shaft, the worm 18 being single threaded, and the pitch or lead so proportioned that the ratio thereof with relation to the pitch of the worm wheel will be twenty to one; that is, twenty revolutions of the drive shaft will impart one revolution to the driven shaft. The worm 19 is double threaded and the ratio thereof to the worm wheel is ten to one; and worm 20 is triple threaded, the ratio thereof to the worm wheel being six and two-thirds to one. The pitch of the worm 17, as already stated, is opposite to the other worms, and single threaded the same as the worm 18, to impart to the driven shaft a slow reverse speed.

While I have shown in the present instance the worms as comprising a series of sleeves in juxtaposition and locked together by a series of tie rods 46 (Fig. 3), it will be readily understood that such worms may be cut on one sleeve, or they may be cut directly on the shaft 1 and the shaft mounted in the casing A for endwise movement. Furthermore, the number of worms may be increased to increase the number of forward and reverse speeds to be transmitted to the driven shaft.

I provide a thrust bearing at each end of the worms on the shaft 1, comprising a pair of rings 21, 22 and interpose between said rings a series of balls 23 and ball carrier 24. To hold the worms in assembled position and to adjust them along the shaft 1 I provide outside of the thrust bearings collars 25, mounted for transverse sliding movement on the shaft 1 by means of bushings 26, and connect said collars by means of arms 27, 27' secured to a rod 28 mounted for sliding movement in the upper case section 2. The connections between the ears 27, 27' and the collars comprise a pin 29 fixed in lugs 25' on the collars and engaging in slots in the arms. To retain the bushings 26 against endwise movement I secure washers 30 to the collars 25, as by means of screws. Pivotally secured to the rod 28 outside of the casing is an operating lever or actuator 31, provided with a releasable latch 32 to engage with any one of a series of notches 33 in a fixed rack 34 to lock the lever in any adjusted position, the above described mechanism comprising selective means to adjust the worm sleeve along the drive shaft. The collars 25 are provided with oppositely and outwardly extending ears or lugs 37 to engage in slideways 38 in the walls of the casing to lock the worms against endwise movement when in mesh with the worm wheel 35.

The operation of the mechanism is substantially as follows: Assuming the parts to be in the positions in Fig. 1, with the worm 20 at the extreme right-hand end in mesh with the worm-wheel 35, rotary motion being imparted to said worm by the shaft 1 from any suitable source. When the said worm 20 is in mesh with the worm-wheel the driven shaft is driven at its highest velocity. When the worm 18 is in mesh with the worm-wheel the driven shaft is driven at its lowest velocity, and an intermediate speed being obtained by the worm 19; when the worm 17 is in mesh with the worm-wheel a slow reverse speed is imparted to the driven shaft 36. As above stated, the worm 20 is in mesh with the driven shaft gear 35 transmitting high forward speed to the shaft 36. Should it now be desired to reverse the motion of said shaft pressure is applied to the foot-piece 39 on the operating lever or actuator 15 connected to the sleeve 13, forcing said sleeve to the right of Fig. 1, the engagement of the thread in the sleeve with the helical thread 12 on the shaft extension 11 rotating the shaft 10 and pinions 9, and thereby rotating the eccentrics 7 and rocking the shaft 1, lifting the worm out of mesh with the driven shaft gear, (Fig. 8,) the lugs 37 on the collars 25 being slid upwardly in the slideways 38 formed in the lower case section 3. The worms are now slid along the shaft 1 by means of the lever 31 connected to the rod 28 and to the collars 25 by the arms 27, until the worm 17 is above the worm wheel 35 when the actuator 31 is locked in such position by the releasable latch 32 engaging with one of the notches 33 in the rack 34. Pressure is then released from the foot-piece 39 of the actuator 15, and the actuator is returned to normal position by means of a spring 45, the worm on the sleeve 13 in engagement with the worm on the shaft extension 11 rotating the shaft 10 and pinions 9 and consequently the eccentrics in a direction opposite to that when the worm 20 was thrown out of mesh with the worm wheel 35, causing the worm 17 to fall into mesh with the worm wheel 35, the lugs 37 of the right-hand collar 35 engaging in the slideways 38 at the extreme right-hand end of the casing to lock the worms against endwise movement. The parts are now in position to transmit reverse speed to the driven shaft 36, the worms being in the extreme right-hand position as shown in dotted lines in Fig. 2. To again transmit forward speed to the drive shafts the above operations are repeated and the worms adjusted along the shaft 1 by the lever or actuator 31, until the worm which it is desired to throw into mesh with the worm-wheel is opposite said worm-wheel when the lever 31 is locked in such position by the latch 32, pressure being then released from the lever 15 and said selected worm automatically dropping into mesh with the worm wheel.

In Fig. 3 I have illustrated the worm-wheel and driven shaft as forming a part of an axle provided with differential gearing and used in connection with the driving wheels of a motor vehicle. The driven shaft is in two parts and held in operative relation by means of a sectional casing 41 readily secured together and to which the worm wheel 35 is fixed, said casing inclosing the differential gearing comprising bevel gears 42, 42' connected to the said shaft sections and pinions 43, 43' rotatively mounted in the casing 41, this gearing compensating for any difference in the rotation of the shaft sections caused by the wheels of the vehicles.

Variations may be resorted to within the scope of the invention, and portions of the improvements may be used without others.

Having thus described my invention, I claim:

1. A variable speed power transmission mechanism, comprising in combination a casing; a driving shaft journaled in eccentric bearings in said casing; a driven shaft; a toothed wheel fixed to the driven shaft; a plurality of worms mounted upon the driving shaft to rotate therewith and adjustable along the same; means to adjust the worms along the driving shaft to change the speed and direction of the driven shaft; and a rotatable shaft geared to the bearings of the driving shaft whereby as said latter shaft is rotated in one direction the worms are thrown into mesh with the toothed wheel on the driven shaft, and when rotated in a reverse direction the worms are thrown out of mesh with said wheel.

2. A variable speed power transmission mechanism, comprising in combination a casing; a driving shaft journaled in eccentric bearings in said casing; a driven shaft; a toothed wheel fixed to the driven shaft; a plurality of worms mounted upon the driving shaft to rotate therewith and adjustable along the same; means to adjust the worms along the driving shaft; means to impart motion to the bearings of the driving shaft whereby to throw the worms into or out of mesh with the toothed wheel on the driven shaft; and means connected to the worms to engage with the casing when thrown into mesh with the driven shaft wheel to lock the driving worms against endwise movement on the driving shaft.

3. In a variable speed power transmission mechanism, a casing, a drive shaft having an eccentric bearing at each end in said casing, a plurality of single and multiple threaded worms on the drive shaft, the pitch of at least one of which worms is opposite to the pitch of the other worms, said worms rotating with and slidable along the drive shaft; a collar at each end of the worms to engage in guideways in the casing to lock said worms against endwise movement; a driven shaft; a worm wheel connected thereto; and selective means to adjust the worms along the drive shaft and throw either one of said worms into mesh with the worm wheel on the driven shaft.

4. In a variable speed power transmission mechanism, a casing; a drive shaft having an eccentric bearing at each end in said casing; a plurality of single and multiple threaded worms mounted on the drive shaft to rotate therewith and slide therealong, the pitch of at least one of which worms is opposite to the pitch of the other worms; a collar at each end of the worms to engage in guideways in the casing to lock said worms against endwise movement; a driven shaft, a worm-wheel thereon; means to throw said worms into and out of mesh with the worm-wheel on the driven shaft; and selective means to adjust the worms along the drive shaft.

5. In a variable speed power transmission mechanism, a casing; a drive shaft having an eccentric bearing at each end in said casing; a plurality of single and multiple threaded worms mounted on the drive shaft to rotate therewith and slide therealong, the pitch of at least one of which worms is opposite to the pitch of the other worms; a collar at each end of the worms to engage in guideways in the casing to lock said worms against endwise movement; a driven shaft; a worm-wheel thereon; and means to throw said worms into and out of mesh with the worm-wheel on the driven shaft, comprising a gear connected to each of the eccentric bearings, a shaft having a helical slot, pinions on said shaft to mesh with said gears, a sleeve on the pinion shaft having a thread to engage with the helical slot in said shaft, and a pivoted operating lever or actuator connected to said sleeve.

6. In a variable speed power transmission mechanism, a casing; a drive shaft having an eccentric bearing at each end in said casing; a plurality of single and multiple threaded worms mounted on the drive shaft to rotate therewith and slide therealong, the pitch of at least one of which worms is opposite to the pitch of the other worms; a collar at each end of the worms to engage in guideways in the casing to lock said worms against endwise movement; a driven shaft; a worm-wheel thereon; means to throw said worms into and out of mesh with the worm wheel, comprising a gear connected to each of the eccentric bearings, a shaft having a helical slot therein, pinions on said shaft to mesh with the eccentric bearing gears, a nut on that portion of the shaft having the helical slot, and a pivoted operating lever or actuator connected to said nut; and means to adjust the worms along the drive shaft.

7. In a variable speed power transmission mechanism, a casing; a drive shaft having an eccentric bearing at each end in said casing; a plurality of single and multiple threaded worms mounted on said shaft to rotate therewith and slide along the same, the pitch of at least one of which worms is opposite to the pitch of the other worms; a collar at each end of the worms to engage in guideways in the casing to lock said worms against endwise movement; a driven shaft; a worm-wheel thereon; means to throw said worms into and out of mesh with the worm-wheel; and selective means to adjust the worms along the drive shaft, comprising a rod connected to the collars at the ends of the worms, and a pivoted operating lever or actuator connected to said rod.

8. In a variable speed power transmission mechanism, a casing; a drive shaft having an eccentric bearing at each end in said casing; a plurality of single and multiple threaded worms mounted on the drive shaft to rotate therewith and slide along the same, the pitch of at least one of which worms is opposite to the pitch of the other worms; a collar at each end of the worms to engage in guideways in the casing to lock said worms against endwise movement; a driven shaft; a worm-wheel connected thereto; means to throw said worms into and out of mesh with the worm-wheel, comprising a gear connected to each of the eccentric bearings, a shaft journaled in the casing, said shaft projecting from the casing and having a helical slot therein, pinions fixed thereto to mesh with the eccentric bearing gears, a sleeve on the projecting portion of said shaft having a thread to engage with the helical slot, and a pivoted operating lever or actuator connected to said sleeve; and selective means to slide the worms along the drive shaft, comprising a rod connected to the collars at the ends of the worms, and a pivoted operating lever or actuator connected to said rod.

9. In a variable speed power transmission mechanism, a casing; a drive shaft having an eccentric bearing at each end in said casing, bushings in which said eccentrics are mounted; a plurality of single and multiple threaded worms of the same pitch but varying leads, and the pitch of at least one of which worms is opposite to the pitch of the others on the drive shaft, said worms rotating with and slidable along the drive shaft; a thrust bearing at each end of the worms; a collar also at each end of the worms outside of the thrust bearing to engage in guideways in the casing to lock the worms against endwise movement; a driven shaft; a worm-wheel thereon; means to throw either one of said worms into mesh with the worm wheel, comprising a gear connected to each of the eccentric bearing bushings; a shaft mounted in the casing and having a helical slot therein; pinions on said shaft to mesh with the gears on the eccentric bearing bushings, a threaded nut on said shaft, and a pivoted operating lever or actuator connected to said nut.

10. In a variable speed power transmission mechanism, a casing; a drive shaft having an eccentric bearing at each end in said casing; bushings in which said eccentrics are mounted; a plurality of single and multiple threaded worms of the same pitch but varying leads, the pitch of at least one of which worms is opposite to the pitch of the others on the drive shaft, said worms rotating with and slidable along the drive shaft; a thrust bearing at each end of the worms; a collar also at each end of the worms outside of the thrust bearings to engage in guideways in the casing to lock the worms against endwise movement; a driven shaft; a worm-wheel thereon; means to throw either one of said worms into mesh with the worm-wheel, comprising a gear connected to each bushing of the eccentric bearings, a shaft having a helical groove mounted in the casing, pinions mounted on said shaft to mesh with the gears on the bushings, a sleeve on the shaft having a worm to engage with the helical groove therein, and a lever or actuator connected to said sleeve operable to impart rotary motion to the said shaft and pinions; and means to adjust the worms along the drive shaft, comprising a rod connected to the collars at the ends of the worms, and a pivoted operating lever or actuator connected to said rod.

11. A variable speed power transmission mechanism, comprising in combination a casing; a drive shaft; eccentric bearings in the casing in which the drive shaft is journaled; a series of worms mounted on said shaft to rotate therewith and adjustable along the same; a driven shaft; a toothed wheel fixed to said shaft with which either one of the drive worms are adapted to mesh; gears connected to the eccentric bearings; a shaft journaled in the casing parallel with the drive shaft; pinions on said shaft to mesh with the bearing gears; and means to impart rotary motion to the pinion shaft whereby to rotate the eccentric bearings and throw the drive worms into or out of mesh with the driven shaft wheel.

12. A variable speed power transmission mechanism, comprising in combination a casing; a drive shaft; eccentric bearings in said casing in which the drive shaft is journaled; a series of worms mounted on said shaft to rotate therewith and adjustable along the same; a driven shaft; a toothed wheel fixed to said shaft with which either one of the drive worms are adapted to mesh; gears connected to the eccentric bearings; a shaft journaled in the casing parallel with the drive shaft; pinions on said shaft to mesh with the bearing gears; means to impart motion to the pinion shaft whereby to rotate the eccentric bearings and throw the drive worms into or out of mesh with the driven shaft wheel; and means connected to the drive worms adapted to engage with the casing to prevent axial movement of said worms on the shaft when in mesh with the driven shaft wheel.

13. A power transmission mechanism, comprising a driving shaft; eccentric bearings in which said shaft is journaled; a worm on said shaft; a driven shaft; a toothed wheel fixed to said latter shaft; and means to rotate the eccentric bearings to throw the worm into or out of mesh with the driven shaft wheel, comprising a rotatable shaft geared to the eccentric bearings, and means to rotate said latter shaft.

14. In a variable speed power transmission mechanism, a casing; a drive shaft; eccentric bearings in the casing in which said shaft is journaled; a plurality of single and multiple threaded worms mounted on the drive shaft to rotate therewith and slidable along the same, the pitch of at least one of which worms is opposite to the pitch of the other worms; selective means to adjust the worms along the drive shaft; a driven shaft; a toothed wheel on said shaft; means to throw either one of said worms into or out of mesh with the toothed wheel on the driven shaft; and means connected to the worms adapted to engage with the casing when the worms are thrown into mesh with the toothed wheel on the driven shaft to lock said worms against axial movement.

WILLARD IRVING TWOMBLY.

Witnesses:
PAULA PHILIPP,
JOHN O. SEIFERT.